May 17, 1966 R. S. BAKER 3,251,302
HELICAL ELECTROMAGNETIC PUMP
Filed Sept. 16, 1963 2 Sheets-Sheet 1

INVENTOR.
RICHARD S. BAKER
BY
AGENT

May 17, 1966 R. S. BAKER 3,251,302
HELICAL ELECTROMAGNETIC PUMP
Filed Sept. 16, 1963 2 Sheets-Sheet 2

INVENTOR.
RICHARD S. BAKER
BY
AGENT

United States Patent Office 3,251,302
Patented May 17, 1966

3,251,302
HELICAL ELECTROMAGNETIC PUMP
Richard S. Baker, Northridge, Calif., assignor to
North American Aviation, Inc.
Filed Sept. 16, 1963, Ser. No. 309,045
5 Claims. (Cl. 103—1)

The present invention relates to an electromagnetic pump, and more particularly to an electromagnetic pump having an A.-C. polyphase winding for pumping electrically conductive fluids.

Electromagnetic pumps have found particular use in the transfer of electrically conductive fluids since there are no moving parts in contact with the fluid being pumped. Electromagnetic pumps develop a pumping force by converting magnetic energy into pressure energy in accordance with the electromagnetic thrust that is generated by the passage of an electric current, either applied or induced, through an electrically conductive fluid transversely to a magnetic field. In effect, the "magnetic impeller" in an electromagnetic pump replaces the mechanical impeller of a mechanical pump.

In my spiral or helical rotor electromagnetic pump as disclosed in Patent No. 2,940,393, issued June 14, 1960, and assigned to the same assignee as the present invention, the magnetic field is mechanically advanced along a volume of electrically conductive fluid in the pumping section or region by the helically arranged rotor and energized D.-C. field coils. The mechanically advanced magnetic field induces eddy currents in the conductive fluid that interact with the advancing magnetic field to impart pumping forces on the fluid.

The helical rotor electromagnetic pump provides, inter alia, greater efficiencies than other types of electromagnetic pumps, and has found particular use where other pumps are inadequate. However, certain design conditions preclude the use of my disclosed helical rotor pump. This is true, for example, where available space is insufficient to house the mechanical and electromechanical hardware that is required to rotate the helical rotor of the disclosed pump. The probability of mechanical interference is also increased where space limitations reduce the available running clearance for the helical rotor.

In addition, certain system requirements are beyond the operating characteristics of my disclosed helical rotor electromagnetic pump. High speed operation of the helical rotor is necessary when high temperature and/or high resistivity fluids are to be pumped; however, the high speed operation of the rotating pump components and bearing arrangements reduces operating life and reliability of the pump. A large slip speed is one reason for high speed rotation of the helical rotor when a high resistivity fluid is being pumped. The slip speed is the difference in speed between the rotor pole velocity along any tangent to the mean liquid circumference and the liquid velocity in the same direction. The slip speed must be large so that sufficient electromotive forces are induced in the fluid to send the required working current through the high resistivity fluid.

When the slip speed must be large to satisfy system requirements, the helical rotor pole velocity is accordingly large. This high speed mechanical velocity creates problems of mechanical construction in the rotating machinery and the helical rotor of my disclosed helical rotor pump.

Accordingly, it is an object of the invention to provide a new and improved electromagnetic pump.

Another object of the invention is to provide an electromagnetic pump having an electrically advancing magnetic field.

A further object is to provide an electromagnetic pump having a helically advancing magnetic field with no moving components.

An additional object of the invention is to provide an electromagnetic pump having an electrically and mechanically advancing magnetic field for pumping electrically conductive fluids, where the respective field velocities are either additive or subtractive.

Further objects, features and the attending advantages of the invention will become apparent with regard to the following description read in conjunction with the accompanying drawings, in which.

Briefly, in accordance with the present invention, an electromagnetic pump is provided for pumping electrically conductive fluids having an electrically advancing magnetic field set up by a helically arranged A.-C. polyphase winding which induces eddy currents in an electrically conductive fluid. The eddy currents flow in patterns which conform with the helical arrangement of the winding and interact with the advancing magnetic field to impart pumping forces on the fluid. The effect of the electrically advancing magnetic field can be increased or decreased by the mechanical rotation of one or more coils of the A.-C. polyphase winding so that the velocities of the electrically advancing field and the mechanically rotating field are either additive or subtractive.

Figure 1:
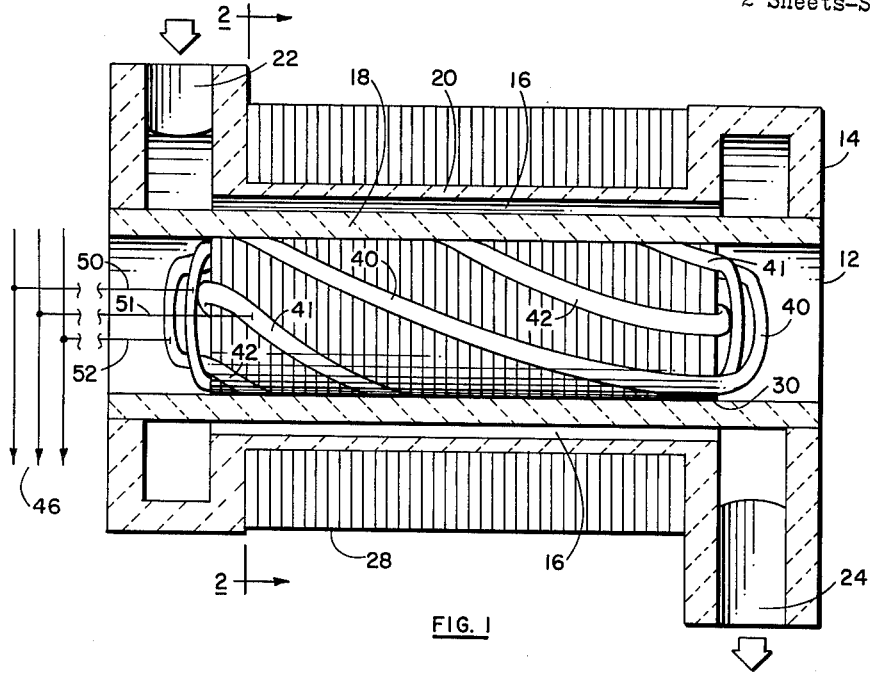
FIGURE 1 is a longitudinal section, partly schematic, of one form of the new and improved electromagnetic pump of the invention.
Figure 2:
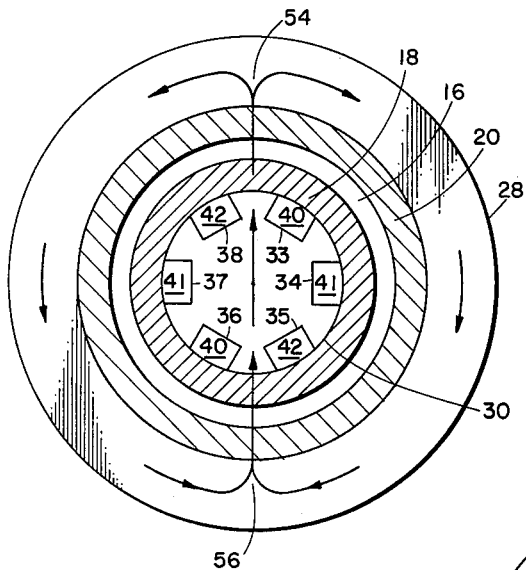
FIGURE 2 is a section, partly schematic, along the line 2—2 of FIGURE 1.

Referring to FIGURES 1 and 2, one form of electromagnetic pump is shown which has no moving or rotating components and depends solely upon an electrically advancing magnetic field to develop the desired pumping forces. A suitably formed inner cylindrical member 12 and a generally cylindrical outer member 14 are concentrically positioned in a preferred relationship to develop a pump region 16 between the spaced apart walls 18 and 20. The pump region 16 has at least one inlet port 22 and one outlet port 24. The functions of the ports can be reversed when required by a particular pump operation.

The inner and outer members 12 and 14 are formed from known metals, such as stainless steel, and refractory materials or the like. In pumping certain electrically conductive fluids, such as molten metals, the flow passages are preferably formed from a material adapted to withstand high operating temperatures.

A flux return structure 28 is positioned around the outer member 14 so that the structure is generally circumjacent to the pump region 16. The flux return structure 28 is preferably a plurality of laminations stacked in sandwich fashion with their flat sides perpendicular to the longitudinal axis of the inner and outer members 12 and 14. The laminations are usually formed from a suitable magnetic material, such as silicon steel, and individually coated with a suitable insulating material. It is preferred to maintain the magnetic material at a temperature less than its magnetic limit or Curie temperature.

A magnetic core member 30 is positioned within the inner cylindrical member 12 in a non-rotating arrangement. While suitable insulation may be required in certain uses, it has been omitted in the drawings for purposes of clarity. Magnetic member 30 is preferably a laminated core similar to the laminated flux return structure 28. The magnetic member is also preferably concentrically positioned within the inner member 12 and axially positioned so that the flux return structure 28 is circumjacent to both the pump region 16 and the magnetic core member 30.

The magnetic core member 30 has a plurality of spaced slots 33–38 which are circumferentially skewed while traversing the axial length of the magnetic member to develop helically arranged slots. Loop-type field coils 40–42 are individually positioned in diametrically opposite slots; i.e., coil 40 in slots 33 and 36, coil 41 in slots 34 and 37, and coil 42 in slots 35 and 38; each pair of slots being generally 180 mechanical degrees apart. The preferred field coil arrangement shown in FIGURES 1 and 2 is particularly adapted for a three-phase A.-C. power source since the field coils 40–42 are displaced approximately 120° from each other. It is contemplated that the number of field coils can be an integral multiple of the number of phases of a polyphase power source, and it is further contemplated that the physical span of each coil may be other than 180 mechanical degrees as shown.

In operation, the electromagnetic pump shown by FIGURES 1 and 2 is electrically connected to a balanced A.-C. polyphase power source, such as the three-phase power source 46 schematically shown by FIGURE 1. Suitable leads 50–52 and related switchgear (not shown) electrically connect the power source 46 to the respective field coils 40–42. The balanced polyphase electromotive forces provide a source of magnetic flux and set up a magnetic field which is schematically shown by FIGURE 2.

Referring now to FIGURE 2, the magnetic field passes from the magnetic core member 30 through the pump region 16 and the conductive field therein into the flux return structure 28. The magnetic field divides into at least two flow paths and passes circumferentially through the flux return path in a plane that is generally normal to the longitudinal axis of the pump. After recombining, the magnetic field passes back through the pump region to the magnetic core member 30.

Since the slots 33–38 and the associated field coils 40–42 are helically arranged, the magnetic flux field is distributed in at least one helical path around the magnetic core member 30. The magnetic field electrically rotates or advances, because of the balanced three-phase A.-C. power source 46, and develops regions of maximum field intensity, such as those indicated at 54 and 56 by FIGURE 2.

The electrically advancing magnetic field induces eddy currents in the electrically conductive fluid in pump region 16 in accordance with the right-hand rule of electrophysics. These induced eddy currents interact with the advancing magnetic field and produce an electromotive thrust or pumping force on the fluid in accordance with the left-hand rule of electrophysics. This pumping force imparts both axial and circumferential movement to the conductive fluid and moves the fluid from the inlet port 22 to the outlet port 24.

Figure 3:
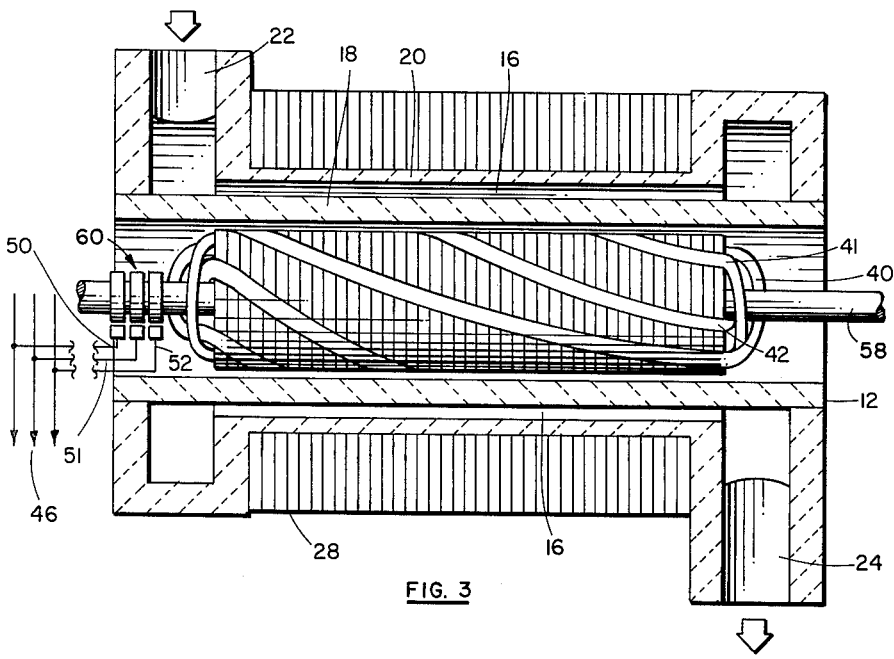
FIGURE 3 is a longitudinal section, partly schematic, of another form of the electromagnetic pump.

Another form of the new and improved electromagnetic pump is shown by FIGURE 3. The same reference characters are used to indicate corresponding pump parts previously described in view of FIGURES 1 and 2.

Structurally, the electromagnetic pump shown by FIGURE 3 differs from the pump of FIGURES 1 and 2 in that the magnetic core member 30 is secured to or integrally formed with a core or rotor shaft 58, and driven by a suitable prime mover (not shown). Magnetic core member 30 is rotatably supported with respect to the inner cylindrical member 12 by suitable bearing arrangements (not shown) for the shaft 58.

Electrical leads 50–52 are electrically connected to the polyphase power source 46 through well-known brushes and slip rings, generally indicated at 60, and related switchgear (not shown).

Operatively, when the field coils 40–42 are electrically connected to the power source 46, the balanced polyphase electromotive forces set up an electrically rotating or advancing magnetic field as previously described. Simultaneous rotation of the shaft 58 and the magnetic core member 30 by the prime mover, results in varying the total slip velocity. A wide range of slip velocities are possible since the simultaneous rotation can be in an additive or subtractive direction with regard to the direction of the electrically advancing magnetic field. When the magnetic core member is not rotated by the prime mover, the principle of operation becomes that of the pump previously described and shown by FIGURES 1 and 2.

Rotation of the magnetic core member 30 by the external prime mover (not shown) in the same direction as the electrically rotating field results in additive velocities. Thus, where a total slip velocity of approximately 7200 r.p.m. is required, the core member 30 may be mechanically rotated at 3600 r.p.m. and may be excited by the polyphase power source 46 to set up an electrically rotating field relative to the core member of 3600 r.p.m. for a total velocity of 7200 r.p.m. The total velocity is substantially increased over that which would be individually obtained by either electrically or mechanically rotating the magnetic flux field.

Mechanical rotation of the core member 30 in a direction opposite to the direction of the electrically rotating or advancing magnetic field may be desirable where direct drive of the core member by the external prime mover (not shown) is required. The subtractive effect of the mechanical velocity in this instance develops a magnetic field travelling at a reduced velocity with improved efficiency.

Figure 4:
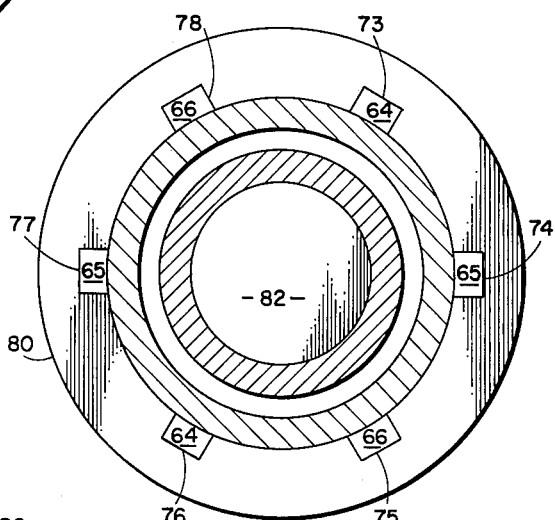
FIGURE 4 is a sectional view of one modification of the electromagnetic pump of FIGURE 1.

FIGURE 4 shows one modification of the field coil arrangement as shown by FIGURES 1 and 2. Certain design parameters may best be satisfied by the positioning of field coil 64–66 in diametrically opposite slots 73–78 helically arranged in the laminated flux return structure 80. Magnetic core member 82 is also laminated and functions as an inner flux return path for an electrically advancing magnetic field. Operation of the pump shown by FIGURE 4 is similar to the operation previously described for the pump of FIGURES 1 and 2.

Figure 5:
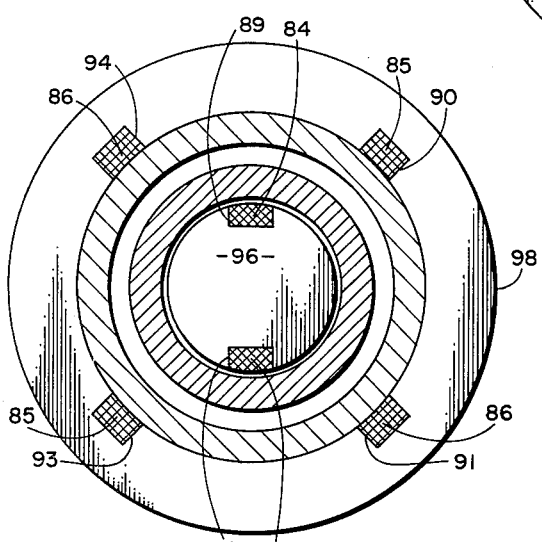
FIGURE 5 is a sectional view of another modification of the electromagnetic pump of the present invention.

FIGURE 5 shows another modification of the field coil arrangement where the field coils 84–86 are arranged in suitable slots 89–94 in the magnetic core member 96 and the flux return structure 98, both similar to magnetic core member 30 and flux return structure 28 of FIGURES 1 and 2. Operation of the pump shown by FIGURE 5 is similar to the operation of the foregoing pumps previously described. However, it is contemplated that appropriate individual coils of the field coils 84–86 may be suitably connected to a D.-C. source of electromotive force. For example, field coils 85 and 86 can be connected to an A.-C. polyphase power source, and field coil 84 can be connected to a D.-C. power source. Since field coil 84 is positioned in the magnetic core member 96, mechanical rotation of the core member by a prime mover (not shown) advances the magnetic flux field set up by the D.-C. energized field coil 84. The mechanical advancement of the magnetic field set up by coil 84 is preferably in synchronism with the electrically advancing magnetic field set up by field coils 85 and 86.

Utilizing A.-C. and D.-C. power sources for the respective field coils 84–86 facilitates flow control of the electrically conductive fluid that is being pumped. When at least one of the field coils, such as coil 84, is supplied from a D.-C. power source, primary flow control is realized by varying the direct current supplied to the field coil. It is understood that the exact division of the total magnetomotive force as supplied by the field coils 84–86 will be established to yield the optimum pump efficiency.

Mechanical rotation of a magnetic core member, such as core member 96 in FIGURE 5, is necessary when a distributed field coil winding (not shown) is associated with the core member and all the field coils are suitably connected to an A.-C. polyphase power source. The rotation of the core member is preferably at a selected speed which will lock the respective magnetic fields set up by the individual field coils in synchronism.

As will be evidenced from the foregoing description, certain aspects of the invention are not specifically limited to the particular details of construction as illustrated. While the field coils are shown embedded in an associated pump component, the coils can also be arranged on the component surface. The use of salient and non-salient pole configurations formed in a well-known manner is also contemplated. It is intended that the appended claims shall cover such modifications and applications as will occur to those skilled in the art and which do not depart from the true spirit and scope of my invention.

Having described my invention, what I claim as new and desire to secure by Letters Patent is:

1. An electromagnetic pump for pumping electrically conducting fluids comprising:
   (a) a generally cylindrical first member having a longitudinal axis,
   (b) a generally cylindrical second member substantially concentric with and spaced apart from said first member,
   (c) a longitudinally extending pump region developed between said spaced apart first and second cylindrical members,
   (d) a longitudinally extending magnet means positioned substantially within said first cylindrical member,
   (e) at least one field coil of a helically arranged A.-C. polyphase winding associated with said magnet means,
   (f) driving means adapted to rotate said magnet means in an additive or subtractive manner,
   (g) a circumferentially extending flux return path means associated with said second cylindrical member,
   (h) at least one inlet and one outlet port to said pump region, and
   (i) a source of balanced polyphase electromotive forces suitably connected to said A.-C. winding and providing a source of magnetic flux across said pump region,
   (j) said magnetic flux helically advancing so that eddy currents induced in a conductive fluid in said pump region interact with the advancing magnetic flux field and complement the mechanically advancing magnetic flux to impart forces on the fluid.

2. An electromagnetic pump for pumping electrically conductive fluids comprising:
   (a) first and second members generally spaced apart,
   (b) a pump region developed between said spaced-apart members,
   (c) magnet means associated with said first member,
   (d) at least one field coil of a helically arranged A.-C. polyphase winding associated with said magnet,
   (e) flux return path means associated with said second member,
   (f) a source of substantially balanced polyphase electromotive forces suitably connected to said A.-C. winding and providing a source of electrically and helically advancing magnetic flux across said pump region, and
   (g) driving means adapted to mechanically rotate said magnet means so that said helically advancing magnetic flux induces eddy currents in a conductive fluid in said pump region which interact with the mechanically and electrically advancing magnetic flux field to impart pumping forces on the fluid.

3. An electromagnetic pump for pumping electrically conductive fluids comprising:
   (a) a generally cylindrical first member having a longitudinal axis,
   (b) a second member spaced apart from said first member,
   (c) a longitudinally extending pump region developed between said first and second members,
   (d) magnet means associated with said first member,
   (e) at least one field coil of a helically arranged A.-C. polyphase winding associated with said magnet means,
   (f) a flux return path means associated with said second member,
   (g) at least one inlet and one outlet port to said pump region,
   (h) a source of balanced polyphase electromotive forces suitably connected to said A.-C. winding and providing a source of electrically and helically advancing magnetic flux across said pump region, and
   (i) driving means adapted to mechanically rotate said magnet means so that said helically advancing magnetic flux induces eddy currents in a conductive fluid in said pump region which interact with the mechanically and electrically advancing magnetic flux field to impart pumping forces on the fluid and move the fluid from said inlet port to said outlet port.

4. An electromagnetic pump for pumping electrically conductive fluids comprising:
   (a) a generally cylindrical first member having a longitudinal axis,
   (b) a generally cylindrical second member substantially concentric with and spaced apart from said first member,
   (c) a longitudinally extending pump region developed between said spaced-apart first and second cylindrical members,
   (d) a longitudinally extending magnet means positioned substantially within said first cylindrical member,
   (e) at least one field coil of a helically arranged A.-C. polyphase winding associated with said magnet means,
   (f) a circumferentially extending flux return path means associated with said second cylindrical member,
   (g) at least one inlet and one outlet port to said pump region,
   (h) a source of balanced polyphase electromotive forces suitably connected to said A.-C. winding and providing a source of electrically and helically advancing magnetic flux across said pump region, and
   (i) driving means adapted to mechanically rotate said magnet means so that said helically advancing magnetic flux induces eddy currents in a conductive fluid in said pump region which interact with the mechanically and electrically advancing magnetic flux field to impart pumping forces on the fluid and move the fluid from said inlet port to said outlet port.

5. An electromagnetic pump for pumping electrically conductive fluids comprising:
   (a) a generally cylindrical first member,
   (b) a second member spaced apart from said first member,
   (c) a pump region developed between said spaced-apart first and second members,
   (d) flux return means cooperating with at least one of said first and second members,
   (e) a plurality of helically arranged field coils cooperating with said first and second members,
   (f) a source of substantially balanced A.-C. electromotive forces,
   (g) a source of D.-C. electromotive forces,
   (h) selected ones of said plurality of field coils suitably connected to respective ones of said A.-C. and D.-C. sources thereby providing a source of magnetic flux across said pump region,
   (i) said field coils connected to said source of A.-C. electromotive forces providing an electrically and helically advancing magnetic flux field, and
   (j) driving means adapted to mechanically rotate said field coils connected to said source of D.-C. electromotive forces in a desired direction so that the mechanically advancing magnetic flux field and the electrically advancing magnetic flux field induce eddy currents in a conductive fluid in said pump region which interact with the helically advancing magnetic flux field to impart pumping forces on the fluid.

References Cited by the Examiner

UNITED STATES PATENTS 2,786,416  3/1957  Fenemore _____ 103—1
3,187,672  6/1965  Baker _____ 103—1

LAURENCE V. EFNER, *Primary Examiner.*